US009018264B2

(12) United States Patent
Freese

(10) Patent No.: US 9,018,264 B2
(45) Date of Patent: *Apr. 28, 2015

(54) AQUEOUS DELIVERY SYSTEM FOR LOW SURFACE ENERGY STRUCTURES

(71) Applicant: W. L. Gore & Associates, Inc., Newark, DE (US)

(72) Inventor: Donald Freese, Chadds Ford, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/804,032

(22) Filed: Mar. 14, 2013

(65) Prior Publication Data

US 2013/0221265 A1 Aug. 29, 2013

Related U.S. Application Data

(62) Division of application No. 11/138,876, filed on May 25, 2005.

(51) Int. Cl.
| C09K 3/00 | (2006.01) |
| B01F 17/00 | (2006.01) |
| C09D 7/12 | (2006.01) |
| D06M 13/144 | (2006.01) |
| C08K 5/05 | (2006.01) |

(52) U.S. Cl.
CPC ............ *B01F 17/0092* (2013.01); *C08K 5/05* (2013.01); *C09D 7/1233* (2013.01); *D06M 13/144* (2013.01)

(58) Field of Classification Search
CPC . A01B 12/006; C09D 7/1233; D06M 13/144; C08K 5/05; B01F 17/0092
USPC ................. 427/384; 516/53, 72, 76
See application file for complete search history.

(56) References Cited

U.S. PATENT DOCUMENTS

| 2,221,933 | A | | 11/1940 | Eitelman et al. |
| 4,098,694 | A | | 7/1978 | Perlaky |
| 4,141,871 | A | | 2/1979 | Shimp et al. |
| 4,396,738 | A | | 8/1983 | Powell et al. |
| 5,169,884 | A | | 12/1992 | Lindemann |
| 5,288,384 | A | | 2/1994 | Banerjee |
| 5,290,472 | A | * | 3/1994 | Michael ............... 510/217 |
| 5,395,566 | A | | 3/1995 | Kobayakawa |
| 5,460,872 | A | | 10/1995 | Wu et al. |
| 5,539,072 | A | | 7/1996 | Wu |
| 5,814,405 | A | | 9/1998 | Branca et al. |
| 5,952,004 | A | | 9/1999 | Rudnic et al. |
| 6,228,477 | B1 | | 5/2001 | Klare et al. |
| 6,235,662 | B1 | | 5/2001 | Zehnder |
| 6,361,870 | B1 | | 3/2002 | Steffl et al. |
| 6,676,993 | B2 | | 1/2004 | Klare |
| 6,926,745 | B2 | | 8/2005 | Scheuing et al. |
| 2004/0002554 | A1 | | 1/2004 | Klare |
| 2004/0161369 | A1 | | 8/2004 | Chan et al. |
| 2005/0043478 | A1 | | 2/2005 | Huang et al. |
| 2005/0181031 | A1 | * | 8/2005 | Saito et al. .................. 424/448 |
| 2006/0270744 | A1 | | 11/2006 | Freese |

FOREIGN PATENT DOCUMENTS

| CN | 1116220 | 2/1996 |
| CN | 1250804 | 4/2000 |
| CN | 1404732 | 3/2003 |
| EP | 058 062 | 8/1982 |
| EP | 561875 | 3/1995 |
| EP | 58 1168 | 10/1996 |
| EP | 615779 | 7/1997 |
| GB | 1 015 373 | 12/1965 |
| GB | 1 273 291 | 5/1972 |
| JP | 10-001627 | 2/1998 |
| JP | 2001513530 | 3/1999 |
| JP | 2000282246 | 10/2000 |
| JP | 2006307137 | 11/2006 |
| WO | WO92/10532 | 6/1992 |
| WO | WO0066655 | 11/2000 |
| WO | WO2006127946 | 11/2006 |
| WO | WO2012135895 | 10/2012 |

OTHER PUBLICATIONS

PCT International Search Report for PCT/US2006/020309 with Written Opinion 17 pages Feb. 8, 2007.
Zhai et al. Chemical and Physical Aspects of Macroemulsions Stabilized by Interfacial Colloids, J. Phys. Chem. 1996, 100, 11019-11028.
Kovalchuk et al. "Comparison of Surface Tension Auto-Oscillations in Fatty Acid-Water and Aliphatic Alcohol-Water Systems" Materials Science and Engineering C22 (2002) 147-153.
PCT International Search Report for PCT/US2014/025647 mailed Jun. 30, 2014.
PCT International Search Report for PCT/US2024/025782 mailed Aug. 6, 2014.

* cited by examiner

*Primary Examiner* — Robert S Walters, Jr.
(74) *Attorney, Agent, or Firm* — Amy L. Miller

(57) ABSTRACT

An aqueous delivery system is described including at least one surfactant and at least one water insoluble wetting agent. Further described are low surface energy substrates, such as microporous polytetrafluoroethylene, coated with such an aqueous solution so as to impart a change in at least one surface characteristic compared to the surface characteristics of the uncoated low surface energy substrate.

23 Claims, No Drawings

AQUEOUS DELIVERY SYSTEM FOR LOW SURFACE ENERGY STRUCTURES

CROSS REFERENCE TO RELATED APPLICATIONS

This application is a divisional of U.S. patent application Ser. No. 11/138,876 filed May 25, 2005, the entire contents of which are expressly incorporated herein by reference in its entirety.

FIELD OF THE INVENTION

The present invention relates to an aqueous system for coating low surface energy surfaces and to coated surfaces formed therefrom.

BACKGROUND OF THE INVENTION

Conventional aqueous micellar delivery systems have been used predominantly in the pharmaceutical industry to provide both controlled delivery of drugs and controlled release of pharmaceutical agents. A micellar solution is one that contains at least one surfactant at a concentration greater than the critical micelle concentration ("CMC"). In the case of aqueous micellar solutions, when a hydrophobic or less water soluble material such as an oil is emulsified in the micellar solution, an emulsion results. Due to the often high surfactant concentrations used in many emulsions, the resulting surfactant stabilized emulsion droplets are often very stable. The good stability against coalescence also makes emulsion droplets ideal carriers for other materials. This technology is typically used in the pharmaceutical industry for controlled delivery of pharmaceutical agents such as antibiotics, antimicrobials, antivirals, cardiovascular and renal agents. These agents are commonly incorporated into the hydrophobic component of the carrier emulsion. Frequently, such emulsions are comprised of a hydrophobic material selected from the group consisting of a long chain carboxylic acid, long chain carboxylic acid ester, long chain carboxylic acid alcohol and mixtures thereof.

A permutation of these aqueous micellar delivery systems are microemulsions which form easily, even spontaneously, in the presence of typically high emulsifier concentrations. Microemulsions are particularly useful as delivery vehicles because a range of materials can be contained therein that would otherwise be sensitive to water, such as hydrolysis sensitive materials. In typical pharmaceutical microemulsion applications, the hydrophobic material is a water insoluble organic material that is emulsified by surfactants to form a discontinuous phase in a continuous aqueous phase (see, for example, U.S. Pat. No. 5,952,004 to Rudnic, et, al.). Such microemulsions can be extremely stable and can provide a useful delivery means. For example, pharmaceutical agents may be dispersed into the hydrophobic material and delivered as part of the aqueous emulsion.

Emulsion technology is also used to create polymeric dispersions wherein a monomer is first emulsified in an aqueous surfactant solution and then polymerized. The resulting emulsion polymers, commonly referred to as latexes, have found many uses including paints and coatings. In order for a latex to spread across the substrate surface and form a uniform coating, it is necessary for it to "wet" the substrate to which it is applied. "Wetting" results when the contact angle, θ, between the aqueous latex and the solid substrate is less than about 90 degrees. Spontaneous wetting occurs when the surface energy between the solid and liquid, γSL is less than the surface energy between the solid and air, γSA. The relationship between these parameters and the liquid-air surface energy, γLA, is given by the relationship below:

$$\gamma SL = \gamma SA - \gamma LA * \cos(\theta)$$

This relationship is very important when trying to coat a low surface energy substrate (low γSA), such as for example, materials with a surface energy below about 40 dynes/cm, because a very low γSL is required.

One low surface energy substrate of particular interest is polytetrafluoroethylene ("PTFE") and microporous polytetrafluoroethylene. Due to the inherent hydrophobicity of PTFE, membranes of these materials are of particular interest when in the form of repellent products such as rainwear. Expanded microporous, liquid waterproof polytetrafluoroethylene materials, such as those available from W. L. Gore and Associates, Inc., sold under the trademark GORE-TEX®, as well as expanded PTFE products available from other suppliers are especially well suited for this purpose. The expanded PTFE materials are liquid waterproof, but allow water vapor, in the form of perspiration, to pass through. Polyurethanes and other polymers have been used for this purpose also. To confer good flexibility and light weight in the materials for use in the textile sector, the microporous layer should be made as thin as possible. However, a thinner membrane will generally mean a loss of performance, and thin coatings run the risk of decreasing water repellency.

Low surface energy substrates have historically been coated by solutions having a low γLA and low contact angle. Suitable coating processes for microporous low surface energy materials are described in the art, many of which rely on solvents to wet the desired substrate. For example, EP 0581168 (Mitsubishi) describes the use of perfluoroalkyl methacrylates and perfluoroalkylethyl acrylates for porous polyethylene and polypropylene membranes. These substances are held in physical contact with the surface of the polyolefin porous membrane. The fluorinated monomer or fluorinated monomer and a crosslinking monomer together with a polymerization initiator are dissolved in a suitable solvent to prepare a solution. For example this solution typically can comprises 15% wt. monomer and 85% wt. acetone. After coating, the solvent is vaporized off. The situation is similar with a process for treating the surfaces of polymers with essentially pure solvent solutions containing low concentrations (e.g. less than 1.0% wt.) of amorphous fluoropolymers (WO 92/10532). Likewise, solutions of fluorine-containing polymers are also involved in a patent for coating ePTFE with an amorphous copolymer of tetrafluoroethylene (EP 0561875). In each of these cases, significant quantities of solvent are released during the coating coalescence process. These solvent emissions are both costly and environmentally undesirable. Moreover, solvent-based wetting systems have the inherent limitation of incompatability with a broad range of aqueous fluoropolymers, and the concentration of solvent necessary to wet the substrate limits the amount and type of additive that can be coated on that substrate.

Efforts have been made to convert from these solvent based coating systems to aqueous coatings systems. However, the challenge of achieving stability of the wetting package and to achieve fast wetting speed are hard to meet. One relatively common approach is to add a water soluble organic solvent to the aqueous coating solution or latex. U.S. Pat. No, 6,228,477 teaches a means to coat a low surface energy, microporous PTFE substrate with an otherwise non-wetting, aqueous fluoropolymer dispersion through the use of significant percentages of isopropanol ("IPA"). In one such example, the non-wetting, aqueous fluoropolymer dispersion was diluted to 25% dispersion and 75% IPA, applied to a microporous PTFE substrate. and the solvent evaporated off to thereby form a uniform coating of the desired fluoropolymer. This process unfortunately requires the use of large amounts of IPA and creates significant environmental problems. In other examples in this patent, a number of fluoropolymer treatments were shown to be unstable with high concentrations of water soluble alcohol, further limiting this IPA wetting system.

Aqueous microemulsion systems have been developed to circumvent the need for high levels of VOC's in order to wet low surface energy substrates. One such system that does not require the use of IPA or any other VOC's is taught in U.S. Pat. No. 5,460,872, to Wu et. al. This patent teaches the use of fluorinated surfactants to lower the surface energy and contact angle with microporous PTFE as a means to produce a uniformly coated microporous PTFE substrate. After application of this aqueous dispersion the fluorinated surfactant and the residual water were then removed by heating.

High costs of manufacturing and potential environmental issues with these prior art materials have highlighted the continuing need for a solution to effectively coat low surface energy substrates without high levels of VOC's or undesirable fluorosurfactants.

SUMMARY OF THE INVENTION

The present invention overcomes the limitation of the prior art by providing a robust, stable aqueous delivery system. This invention is capable of wetting low surface energy substrates and thereby can deliver a wide range of organic and inorganic materials to form coatings thereon. The present invention is directed to an aqueous delivery system of a surfactant and a water insoluble alcohol wetting agent. Optionally, one or more materials that permit greater amounts of wetting agent without causing phase separation (i.e., stabilizers) can be added. Added functionality can be incorporated by including one or more additives in the aqueous delivery system. This invention can be used to deliver a range of functional materials to low surface energy materials, including, but not limited to, functionalized or surface active polymers. Also described are low surface energy materials, such as microporous fluoropolymers, coated by the aqueous delivery system. Additionally, the invention includes a coated article including a low surface energy microporous material having a coating on at least a portion of the pore walls of the microporous material, the coating having a measurable amount of surfactant of up to a water insoluble alcohol up to 25% by weight based on the total weight of the coated microporous material.

DETAILED DESCRIPTION OF INVENTION

In the present invention, an aqueous solution is produced when at least one surfactant is used to emulsify at least one water insoluble wetting agent. In a further embodiment, this invention is directed to low surface energy substrates, such as microporous polytetrafluoroethylene, coated via such an aqueous solution so as to impart a change in at least one surface characteristic compared to the surface characteristics of the uncoated microporous substrate.

Application to low surface energy substrates relies on good wetting. To achieve good wetting, the surface tension of the aqueous delivery system should to be sufficiently low to penetrate the microporous substrate. For example, a surface tension of less than or equal to about 30 dynes/cm is typically required to penetrate expanded microporous PTFE. Higher surface tension wetting systems may accordingly be suitable for higher energy substrates such as microporous polyethylene or microporous polypropylene. As previously discussed, the prior art teaches that high levels of water soluble wetting agents such as isopropanol can be used to lower γSL in order to enable certain aqueous coating systems to wet a microporous low surface energy PTFE substrate (U.S. Pat. No. 6,676,993B2).

Suitable wetting agents of the present invention include alcohols and mixtures of alcohols that exhibit a low water solubility, such as those alcohols having five or more carbon atoms in the longest continuous chain, e.g., alcohols with $C_5$-$C_{10}$ linear chains, and the like. For example, pentanols, hexanols, octanols, and the like, are within the range of suitable wetting agents of the present invention. Further, the aqueous delivery system can incorporate with the water insoluble alcohol(s) other water insoluble organics, such as alkanes, etc. Optionally, the wetting agent may also exhibit a low γSL relative to the targeted low surface energy substrate.

The surfactant(s) of this invention can be a single surfactant or a combination of surfactants. Suitable surfactants are defined as those that are able to emulsify the desired wetting agent. For the alcohols described above, several classes of anionic surfactants can be used, including, but not limited to, those having a structure of $R(EO)_nOSO_3^-$ or $ROSO_3^-$ where R can be any organic chain, "O" is oxygen, "S" is sulfur, "EO" is ethylene oxide and n=>1. In an alternate embodiment, nonionic surfactants having the structure $R(EO)_nOH$, where n=>1, are also suitable for this invention, in a preferred embodiment, nonionic surfactants with a hydrophilic-lipophilic balance ("HLB") values of ten or greater were found most effective to emulsify the wetting agents described above. The concentration of surfactant can be adjusted in order to achieve good emulsification of the desired wetting agent. For example, when 4% by weight of hexanol wetting agent (based on the total aqueous solution weight) is used, a concentration of about 2% of sodium dodecyl ether sulfate was found to be suitable. In an alternate formulation, 6% wt. of an ethoxylated alcohol was able to emulsify 4% wt, hexanol wetting agent.

In addition to the aqueous delivery system provided by the surfactant and the wetting agent, a stabilizing agent can optionally be added. A stabilizing agent is typically soluble in both the alcohol and water, and it allows a greater amount of alcohol to be stabilized in the aqueous system than without the stabilizer. In one embodiment, glycols were found to be effective stabilizers, such as but not limited to dipropylene glycol ("DPG"), dipropylene glycol monomethyl ether, and propylene glycol. A wide range of stabilizer concentrations can be used depending on the amount of additional stability desired. For instance, if a small increase in stability is desired, a small amount of the optional stabilizer should be used. Conversely, higher stabilizer concentrations generally further increase the emulsion stability. Exceptions to these general guidelines do however exist. For example, DPG may be an effective stabilizer when used in concentrations ranging from less than about 1% wt. up to about 10% wt. based on total aqueous emulsion weight for hexanol-based systems.

In another aspect of this invention, additional functional additives can optionally be added to the aqueous delivery system. As used herein, the term "functional additive" is intended to refer to any additional material which renders further functionality to the low surface energy substrate than what otherwise exists in the absence of the functional additive. Suitable functional additives include materials which have suitable stability to be delivered and which are either soluble in the aqueous delivery system (either the water or wetting agent) or dispersable in the aqueous delivery system. In one exemplary embodiment of the invention, if the substrate is a polymer layer that is not naturally oleophobic, it can be rendered oleophobic by incorporating within the aqueous delivery system a functional additive which is an oleophobic material. This unique feature of the invention provides significant advantages over conventional solvent coating means of applying, for example, oleophobic materials. This unique delivery system of the present invention provides spontaneous wetting of the substrate, and even in the case of microporous substrates, such as described below, which often have tortuous porosity, the present invention can be tailored to readily facilitate coating at least a portion of the pore walls of the substrate.

In one embodiment of this invention, suitable low surface energy materials can include microporous substrates, as noted in the previous paragraph. Suitable microporous polymers can include fluoropolymers, e.g. polytetrafluoroethylene or polyvinylidene fluorides, polyolefins, e.g. polyethylene or polypropylene; polyamides; polyesters; polysulfone, poly(ethersulfone) and combinations thereof, polycarbonate, polyurethanes. Coatings applied via the present invention to such microporous substrates may be designed to either coat the surfaces of the microstructure leaving the pores open or it can be designed to effectively fill a substantial portion of the pores. In instances where retention of air permeability or high breathability is desired, the present invention should be designed to preserve the open microporous structure, as filling the micropores may destroy or severely lessen the water-evapor transmitting property of the microporous substrate. Thus, the walls defining the voids in the microporous polymer preferably have only a very thin coating of the oleophobic polymer in such an embodiment. Moreover, to maintain flexibility of the substrate, the coating of the functional material should be sufficiently thin to not impact the flexibility of the substrate when coated.

Common oleophobic functional additive compositions suitable for this invention include oleophobic fluorocarbon compounds. For example, the fluorocarbon can be one that contains perfluoroalkyl groups $CF_3—(CF_2)_n—$, where n is $\geq 0$. The following compounds or classes of oleophobic materials, while not exhaustive, can be used:

Apolar perfluoropolyethers having $CF_3$ side groups, such as Fomblin Y—Ausimont; Krytox—DuPont;

Mixtures of apolar perfluoroethers with polar monofunctional perfluoropolyethers PFPE (Fomblin and Galden MF grades available from Ausimont);

Polar water-insoluble PFPE such as, for example, Galden MF with phosphate, silane, or amide, end groups;

Mixtures of apolar PFPE with fluorinated alkyl methacrylates and fluorinated alkyl acrylate as monomer or in polymer form.

The above-mentioned compounds can also optionally be crosslinked by, for example, UV radiation in aqueous form solution or emulsion.

The following polymeric particle solutions, while again not exhaustive, can also be used:

Microemulsions based on PFPE (see EP 0615779, Fomblin Fe20 microemulsions);

Emulsions based on copolymers of siloxanes and perfluoroalkyl-substituted (meth)acrylates (Hoechst);

Emulsions based on perfluorinated or partially fluorinated co- or terpolymers, one component containing at least hexafluoropropene or perfluoroalkyl vinyl ether;

Emulsions based on perfluoroalkyl-substituted poly(meth) acrylates and copolymers (products of Asahi Glass, Hoechst, DuPont and others).

Microemulsions based on perfluoroalkyl-substituted poly (meth)acrylates and copolymers (WU, U.S. Pat. No. 5,539,072; U.S. Pat. No. 5,460,872);

The concentration of the functional material provided by this invention can vary greatly depending on the desired outcome. When an oleophobic fluoropolymer is used as the functional additive material, such as but not limited to, polymers having $—(CF_2)_n—CF_3$ pendant groups, functional materials of this type can impart very low surface energy values to the polymer and thus impart good oil and water resistance properties. Representative oleophobic polymers can be made from organic monomers having pendant perfluoroalkyl groups. These include fluoroalkyl acrylates and fluoroalkyl methacrylates having terminal perfluoroalkyl groups of the formula:

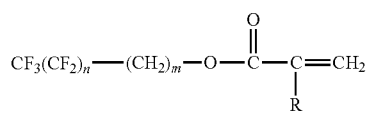

wherein n is a cardinal number of 1-21, m is a cardinal number of 1-10, and R is H or $CH_3$; fluoroalkyl aryl urethanes, fluoroalkyl allyl urethanes, fluoroalkyl urethane acrylates; fluoroalkyl acrylamides; fluoroalkyl sulfonamide acrylates and the like. When a low surface energy coating is desired, concentrations from about 1% wt. up to about 20% wt, based on total emulsion solids may be effective. When coating microporous substrates, the concentration of the oleophobic functional material preferably is between about 3% wt. up to about 12% wt. based on total emulsion weight.

Alternate embodiments of this invention include other optional functional additive materials. The present invention can be used to deliver particulate functional materials to surfaces, provided that the particulate can be dispersed in the emulsion wetting system. In some instances, it may be advantageous to disperse the particulates in a dispersing agent which can subsequently be dispersed in the emulsion wetting system. Hence when a substrate is coated with the aqueous solution, the functional additive particles contained therein will be deposited onto and/or into substrate and its surfaces in order to effect, for example, a color change in the case of a pigment, or other desirable functional change in the substrate. Carbon particles are of particular interest in applications where a change in an electromagnetic spectral response or electric or thermal conductivity of the substrate is desired. In applications involving particulates, concentrations ranging from about 0.1% wt. up to about 5% wt. based on total emulsion weight are often appropriate.

The optional functional material of the present invention may also be materials that are either soluble in the inventive aqueous delivery system or dispersible in the inventive aqueous delivery system. The list of soluble materials that can be used in conjunction with the present invention include but are not limited to simple salts (e.g., AgNo3, CuSo4), simple compounds, polyacrylic acid, polyacrylamide, melamine, polyvinyl alcohol, salts, and dyes. The list of dispersible materials that can be used in conjunction with the present invention include but are not limited to polyfluoroacrylates, polystyrene, pigments, carbon black, and aluminum oxide. One requirement for these dispersible materials is that the particle size be sufficiently small so that then can physically enter the pores of the microporous substrate to which they are being applied. When the microporous substrate is inherently hydrophobic, such a coating can change the surface characteristic from hydrophobic to hydrophilic.

Other useful permutations of this invention are also encompassed within the breadth of functional materials that can be stable in the present aqueous delivery system and thereby subsequently applied to a range of microporous and nonmicroporous substrates.

DEFINITIONS

For the purposes of this application the following terms shall be recognized to have the meaning set forth below unless otherwise indicated:

"Air permeable" means that airflow is observed as determined by the Gurley test described below. It will be appreciated by one of skill in the art that an air permeable material will also be moisture vapor permeable.

"Air-impermeable" means that no airflow is observed for at least two minutes as determined by the Gurley test described below.

"Hydrophilic" material denotes a porous material whose pores become filled with liquid water when subjected to liquid water without the application of pressure.

"Microporous" term is used to denote a continuous layer of material comprised of interconnecting pores which create a passageway extending from one surface of the layer to the opposite surface of the layer.

"Oleophobic" means a material that has an oil resistance of 1 or more, as measured by the Oil Repellency Test, below.

Test Procedures

Air Permeability/Impermeability—Gurley Number Test

Gurley numbers were obtained as follows:

The resistance of samples to air flow was measured by a Gurley densometer (ASTM D726-58) manufactured by W. & L. E. Gurley & Sons, The results are reported in terms of Gurley Number, which is the time in seconds for 100 cubic centimeters of air to pass through 6.54 cm. sup.2 of a test sample at a pressure drop of 1.215 kN/m² of water. A material is air-impermeable if no air passage is observed over a 120 second interval.

Oil Repellency Test

In these tests, oil rating was measured using the AATCC Test Method 118-1983 when testing film composites. The oil rating of a film composite is the lower of the two ratings obtained when testing the two sides of the composite. The higher the number, the better the oil repellency. A value of greater than 1, preferably 2 or more, more preferably 4 or more, is preferred.

The test is modified as follows when testing laminates of the film composite with a textile. Three drops of the test oil are placed on the textile surface. A glass plate is placed directly on top of the oil drops. After 3 minutes, the reverse side of the laminate is inspected for a change in appearance indicating penetration or staining by the test oil. The oil rating of the laminate corresponds to the highest number oil that does not wet through the laminate or cause visible staining from the reverse side of oil exposure. The higher the number, the better the oil repellency. A value of greater than 1, preferably 2 or more, more preferably 4 or more, and most preferably, 6 or more, is preferred.

EXAMPLES

Example 1

In order to determine the amount of 1-hexanol needed to wet ePTFE with a non-ionic surfactant, a nonionic surfactant, Iconol DA-6 (BASF, ethoxylated alcohol, HLB 13), was added to de-ionized water to make a 4 weight % solution. 1-Hexanol was added incrementally to the Iconol DA-6 solution. After each addition of 1-hexanol, the stability of the mixture was examined for phase separation.

The ability of this mixture to wet and penetrate a 50 g/m2 ePTFE membrane (0.2 micron pore size, 100 micron thickness, Gurley number of about 25 sec., W. L. Gore and Associates, Inc, Elkton, Md.) was assessed by measuring the time required for a drop to clarify fully the membrane. The data are shown in Table I. Pure 1-hexanol wets ePTFE in 1-2 sec. Surprisingly, a dilute hexanol (1.7%) and surfactant blend wets ePTFE as fast as pure hexanol.

TABLE I

| Weight % 1-Hexanol | Time to Clarify ePTFE (sec) | Stability |
|---|---|---|
| 0 | >30 | stable, 1 phase |
| 1.2 | 4 | stable, 1 phase |
| 1.7 | 1-2 | stable, 1 phase |

Example 2

Witcolate ES-2 (30% solids, dodecyl ether sulfate, obtained from Witco Chemicals/Crompton Corporation, Middlebury, Conn.) was used to determine that a level as high as approximately 11% surfactant solids could be used to wet ePTFE (50 g/m2) in combination with 1-hexanol. A mixture of 3.9 g of Witcolate ES-2 and 6.1 g of de-ionized water was prepared. 1-Hexanol was added incrementally to this mixture, and the stability and wetting time for ePTFE was measured as in Example 1. The data are shown in Table II.

TABLE II

| Witcolate ES-2 (Wt % solids) | 1-Hexanol (Wt %) | Time to Clarify ePTFE (sec) | Stability |
|---|---|---|---|
| 12 | 0 | >30 | stable, 1 phase |
| 12 | 1.4 | >30 | stable, 1 phase |
| 11 | 3.7 | >30 | stable, 1 phase |
| 11 | 5.9 | partial in 30 sec | stable, 1 phase |
| 11 | 7.6 | 7 | stable, 1 phase |
| 11 | 8.5 | >30 | stable, 1 phase |

Example 3

In order to determine the upper range of 1-hexanol (approximately 30 weight %) that could be used to wet ePTFE, 1.3 g of Witcolate ES-2 (30% solids, dodecyl ether sulfate, obtained from Witco Chemicals/Crompton Corporation, Middlebury, Conn.) was added to 8.7 g of de-ionized water. 1-Hexanol was added incrementally to this mixture, and the stability and wetting time for ePTFE was measured as in Example 1. The data are shown in Table III.

TABLE III

| Witcolate ES-2 (Wt % solids) | 1-Hexanol (Wt %) | Time to Clarify ePTFE (sec) | Stability |
|---|---|---|---|
| 4 | 0 | >30 | stable, 1 phase |
| 3 | 13 | 2 | stable, 1 phase |
| 3 | 17 | 2 | stable, 1 phase |
| 3 | 21 | 3 | stable, 1 phase |
| 3 | 25 | 2 | stable, 1 phase |
| 3 | 31 | 10 | stable, 1 phase |

Example 4

In addition to nonionic and anionic surfactants, cationic surfactants were determined to be useful in combination with 1-hexanol to wet quickly ePTFE, as follows. A dodecyldimethylethyl quaternary ammonium bromide, DAB, (0.3 g) was added to 9.7 g of de-ionized water. 1-Hexanol was added incrementally to this mixture, and the stability and wetting time for ePTFE was measured as in Example 1. The data are shown in Table IV.

TABLE IV

| DAB (weight %) | 1-Hexanol (Weight %) | Time to Clarify ePTFE (sec) | Stability |
|---|---|---|---|
| 3 | 0 | >30 | stable, 1 phase |
| 3 | 1.3 | >30 | stable, 1 phase |
| 3 | 2.7 | 13 | stable, 1 phase |
| 3 | 4.2 | 2 | stable, 1 phase |

Example 5

To determine that compounds soluble in both the water-insoluble alcohol and water such as dipropylene glycol (DPG) can be used to increase the stability of the wetting mixture, a mixture (4 weight %) of a nonionic ethoxylated alcohol surfactant (Iconol TDA-9 from BASF) was prepared. Without DPG, 1-hexanal would cause phase separation at 2.5% 1-hexanol. The addition of 4 weight % DPG increased the stability and the ability to wet ePTFE (50 g/m2). The data are shown in Table V.

TABLE V

| Iconol TDA-9 (Wt. %) | 1-Hexanol (Wt. %) | DPG (Wt %) | Time to Clarify ePTFE (sec) | Stability |
|---|---|---|---|---|
| 4 | 0 | 4 | >30 | stable, 1 phase |
| 4 | 0 | 4 | 15 | stable, 1 phase |
| 4 | 2.1 | 4 | 12 | stable, 1 phase |
| 4 | 2.9 | 4 | 7 | stable, 1 phase |
| 4 | 3.6 | 4 | <1 | stable, 1 phase |

Example 6

Other water-insoluble alcohols were also examined. Pure 1-octanol clarifies ePTFE (50 g/m2) in 5 seconds. A dilute mixture of 1-octanol with Witcolate ES-2 (30% solids, dodecyl ether sulfate, obtained from Witco Chemicals/Crompton Corporation, Middlebury, Conn.) can wet ePTFE as fast as pure octanol. A 13 weight percent (4 weight % solids) Witcolate ES-2 solution was prepared. 1-Octanol was added incrementally to this mixture. The stability and wetting time for ePTFE was measured as in Example 1. The data are shown in Table VI.

TABLE VI

| Witcolate ES-2 (Wt % solids) | 1-Octanol (Wt %) | Time to Clarify ePTFE (sec) | Stability |
|---|---|---|---|
| 4 | 0 | >30 | stable, 1 phase |
| 4 | 1.4 | >30 | stable, 1 phase |
| 4 | 2.9 | 21 | stable, 1 phase |
| 4 | 3.9 | 11 | stable, 1 phase |
| 4 | 4.9 | 7 | stable, 1 phase |
| 4 | 6.2 | 5 | stable, 1 phase |
| 4 | 7.3 | 4 | stable, 1 phase |

Example 7

The ability of surfactant and hexanol mixtures to wet and coat ePTFE with oleophobic materials was examined. Mixtures of 13 weight percent (4 weight percent solids) Witcolate ES-2 (30% solids, dodecyl ether sulfate, obtained from Witco Chemicals/Crompton Corporation, Middlebury, Conn.) and approximately 6 weight percent 1-hexanol were prepared with various fluoroacrylate polymers (9 weight percent solids). The following fluoropolymers were used: AG415 and AG4210 (Asahi Glass Company), Zonyl 7040 (DuPont), and TG-532 (Daikan). These mixtures were spread on one surface of an expanded PTFE membrane (about 20 g/m2, thickness of about 40 micron, and Gurley number of about 15 sec.) until the membrane was clarified. The coated ePTFE was placed in a solvent oven at 190° C. for 2.5 min. The time for a drop of these coating mixtures to clarify ePTFE (50 g/m2) was measured. The stability of the mixture was examined. Oil ratings on the coated and uncoated side of the ePTFE (20 g/m2) were measured. Additionally, the air permeability was determined by measuring the time for 100 cm3 of air to flow through the coated membrane (Gurley). The data show that a range of fluoropolymers can be used to coat ePTFE (Table VII). The uncoated ePTFE has a Gurley of 15.7 sec. The oil rating of ePTFE (uncoated) was 1.

TABLE VII

| Witcolate ES-2 (wt. % solids) | 1-Hexanol (wt %) | Fluoropolymer Type/(wt % solids) | Time to Wet ePTFE (sec) | Oil Rating (coated/uncoated side) | Gurley (sec) |
|---|---|---|---|---|---|
| 3.9 | 6.1 | AG415/9 wt % | 2 | 8/6 | 62.9 |
| 3.9 | 6.3 | Zonyl 7040/9 wt % | 2 | 7/6 | 57.3 |
| 3.9 | 6.1 | TG532/9 wt % | 1 | 8/8 | 38.1 |
| 3.9 | 5.0 | AG4210/9 wt % |  | 8/7 | 38.7 |

Example 8

Multiple functional additives were used to coat an expanded PTFE membrane (20 g/m2, W. L. Gore and Associates, Inc.). A mixture of 1.3 g of Witcolate ES-2 (30% solids, dodecyl ether sulfate, obtained from Witco Chemicals/Crompton Corporation, Middlebury, Conn.), 0.6 g of 1-hexanol, 6.4 g of de-ionized water, 1.5 g of AG8025 (Asahi Glass Company), 0.2 g of melamine resin (Aerotex 3730 from Cytec), and 0.02 g of catalyst (zinc nitrate) was prepared. This mixture wetted the expanded PTFE immediately. The coated ePTFE was placed in a solvent oven at 190° C. for 3 min. The air permeability of the cured sample was measured (Gurley of 48.7 sec for 100 cm3). The sample was also determined to be oleophobic (oil rating of 8 on the coated side and 6 on the uncoated side).

Example 9

In this example, a 5 mil thick, high molecular weight microporous polyethylene (Dewal Corporation) was rendered oleophobic and air permeable using surfactant and hexanol blends with fluoropolymers in accordance with the present invention. Specifically, a mixture of 1.3 g of Witcolate ES-2 (30% solids, dodecyl ether sulfate, obtained from Witco Chemicals/Crompton Corporation, Middlebury, Conn.), 0.6 g 1-hexanol, 5.1 g de-ionized water, and 3.0 g of AG8025 (Asahi Glass Company) was prepared. This mixture was observed to wet the microporous polyethylene membrane.

The coated membrane was heated at 190° C. for 2 min. The oleophobicity of the coated and uncoated sides was measured and was determined to be an oil rating of 7 for each side. A sample of the uncoated precursor polyethylene membrane had an oil rating of less than 1. The air permeability was also measured for the coated sample and the uncoated precursor. The coated sample had a Gurley (100 cm3) measurement of 1.5 sec. The uncoated precursor polyethylene microporous membrane had a Gurley (100 cm3) of 0.3 sec.

The invention claimed is:

1. An aqueous mixture comprising:
   a) at least one water-insoluble alcohol with a $C_5$-$C_8$ linear backbone in an amount up to about 15% by weight of the aqueous mixture; and
   b) at least one surfactant; and
   c) at least one additive,
   wherein said at least one additive comprises at least one polymer soluble in said aqueous mixture, and
   wherein said aqueous mixture wets a low surface energy microporous substrate in 10 seconds or less.

2. The aqueous mixture of claim 1, wherein said at least one water insoluble alcohol is present in an amount of up to about 8% by weight of the aqueous mixture.

3. The aqueous mixture of claim 1, wherein said at least one surfactant is present in an amount of up to about 15% by weight of the aqueous mixture.

4. The aqueous mixture of claim 1, further comprising at least one stabilizing agent.

5. The aqueous mixture of claim 1, wherein said at least one polymer comprises polyacrylic acid.

6. The aqueous mixture of claim 1; wherein said at least one polymer comprises sodium polyacrylic acid.

7. The aqueous mixture of claim 1, wherein said at least one polymer is crosslinkable.

8. The aqueous mixture of claim 7, wherein said at least one polymer comprises a polyelectrolyte.

9. The aqueous mixture of claim 1, wherein said at least one polymer comprises a polyelectrolyte.

10. An aqueous mixture comprising:
    a) hexanol in an amount of up to about 30% by weight of the aqueous mixture; and
    b) an ethoxylated alcohol with a hydrophobic/lipophobic balance of 10 or greater; and
    c) at least one additive,
    wherein said at least one additive comprises at least one polymer soluble in said aqueous mixture.

11. The aqueous mixture of claim 10, further comprising at least one stabilizing agent.

12. The aqueous mixture of claim 10, wherein said at least one polymer comprises polyacrylic acid.

13. The aqueous mixture of claim 10; wherein said at least one polymer comprises sodium polyacrylic acid.

14. The aqueous mixture of claim 10, wherein said at least one polymer is crosslinkable.

15. The aqueous mixture of claim 10, wherein said at least one polymer comprises a polyelectrolyte.

16. The aqueous mixture of claim 14, wherein said at least one polymer comprises a polyelectrolyte.

17. An aqueous mixture comprising:
    a) hexanol in an amount of up to about 30% by weight of the aqueous mixture; and
    b) an ethoxylated sulfate alcohol; and
    c) at least one additive,
    wherein said at least one additive comprises at least one polymer soluble in said aqueous mixture.

18. The aqueous mixture of claim 10, further comprising at least one stabilizing agent.

19. The aqueous mixture of claim 17, wherein said at least one polymer comprises polyacrylic acid.

20. The aqueous mixture of claim 17; wherein said at least one polymer comprises sodium polyacrylic acid.

21. The aqueous mixture of claim 17, wherein said at least one polymer is crosslinkable.

22. The aqueous mixture of claim 21, wherein said at least one polymer comprises a polyelectrolyte.

23. The aqueous mixture of claim 17, wherein said at least one polymer comprises a polyelectrolyte.

* * * * *